Dec. 9, 1924.
C. F. COLLINS ET AL
1,518,901
VALVE PLUG FOR INFLATED BODIES
Filed Jan. 23, 1923
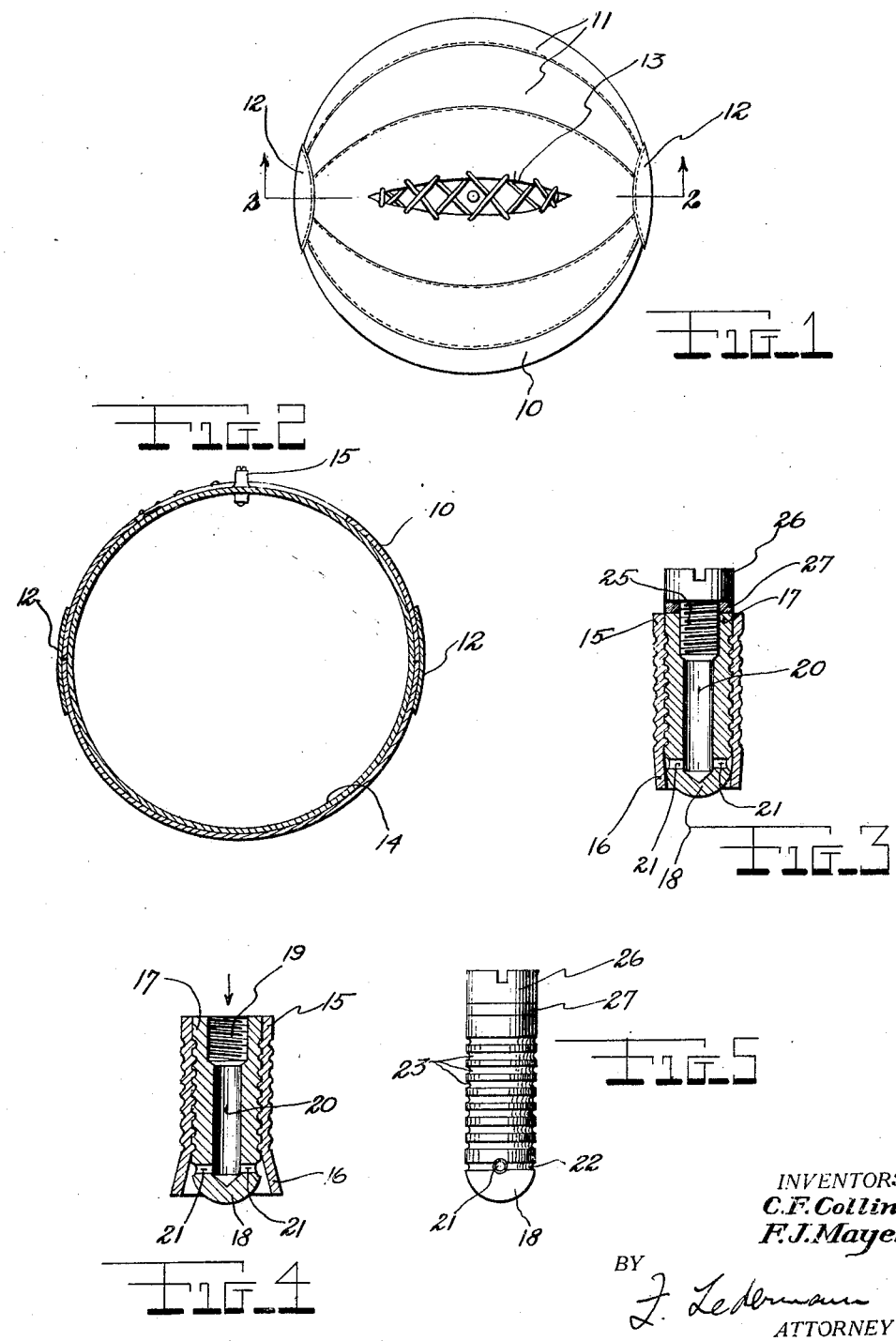
INVENTORS
C.F. Collins
F.J. Mayer
BY
J. Lederman
ATTORNEY Patented Dec. 9, 1924.

1,518,901

UNITED STATES PATENT OFFICE.

CHARLES F. COLLINS AND FRANK J. MAYER, OF WOODHAVEN, NEW YORK.

VALVE PLUG FOR INFLATED BODIES.

Application filed January 23, 1923. Serial No. 614,452.

*To all whom it may concern:*

Be it known that we, CHARLES F. COLLINS and FRANK J. MAYER, citizens of the United States, and residents of Woodhaven, L. I., in the county of Queens and State of New York, have invented certain new and useful Improvements in Valve Plugs for Inflated Bodies, of which the following is a specification.

This invention relates to valves for inflated bodies such as footballs or the like, the main object being to provide means whereby the air content of an inflated ball may be captured therein with no leakage occurring while the ball is being used.

Another object is to provide a novel and simple type of inflation valve which consists of a minimum number of parts conducive to unfailing operation, and uses the inherent flexibility of a rubber tube as a shut-off gate.

These and other objects will become apparent in the description below, in which characters of reference refer to like-named parts in the drawing.

Referring briefly to the drawing, Figure 1 is an elevational view of a socalled basket ball, showing the relative position of the valve.

Figure 2 is a sectional elevational view of the same, the section being taken on line 2—2 of Figure 1.

Figure 3 is a longitudinal sectional elevational view of the valve in sealed position.

Figure 4 is a similar view of the valve, but in open position.

Figure 5 is an elevational view of the valve per se.

Describing the drawing in detail, the numeral 10 indicates the outer leather cover of the ball which is formed by sewing a number of sectors 11 to each other. Circular leather plates 12 are sewed on the sectors where the pointed ends are joined. A slit 13 is formed in one of the sectors thru which a rubber bladder 14 is inserted into the confines of the cover. The bladder is spherical in shape and seamless and has a rubber tube 15 projecting therefrom, the latter being adapted to protrude from the cover thru the slit 13. This tube is fixed permanently in place in the bladder by vulcanizing the lower end 16 of the tube projecting into the bladder. The main body 17 is annular in conformation with a spherical head 18 at its lower end, and has internal threads 19 at its upper end. This head has a longitudinal hole 20 passing thru the body, the lower end of the hole ending in the region of the spherical head 18. A pair of radially extending openings 21 pass thru the wall of the valve near the spherical head and communicate with an annular cannalure 22, the latter being formed on the outer surface of the body. The inner ends of the openings 21 communicate with the hole 20. This body is inserted into the tube 15 until the rounded head 18 can be seen beneath the lower end of said tube 16. A plurality of annular cannalures 23 encircle the body 17 at spaced apart intervals from a point slightly above the openings 22 to a point slightly below the top of the body. When the plug is forced into the tube 15 the tube material will be urged into the cannalures 23 to form a leak-proof fit between the body 17 and the tube 15 so that no air will escape from the bladder 14. The stud 25 of a screw engages the threads 19 at the upper end of the body and the lower face of the head 26 of the screw has a washer 27 seated thereon, said washer preventing the body from becoming clogged with dirt, and also prevents moisture from entering the bladder.

The body 17 is mounted in place in the tube 15 in the manner described, and when it is desired to inflate the bladder 14 the screw 25 is removed from the body. The nipple of a hose of the ordinary type of air pump can be threaded into the hole 19 and inflation can then begin. The air in passing from the hose of the air pump will pass thru the hole 20 and down thru the openings 21. The latter at the lower end of the body 17 are normally covered by the lower end 16 of the tube 15. The air being under pressure in passing thru the openings 21 will course around the lower cannalure 22 and will cause the wall at the lower end 16 of the tube to be distended outwardly and approximately to the position shown in Figure 4, thereby allowing the air to pass into the bladder. It is to be noted that the tube 15 normally envelopes the cannalure 22 and the openings 21 and thereby prevents the air within the bladder from being exhausted. After the bladder has been inflated to the desired degree the screw 26 can then be mounted in place again and the ball can be used as desired.

We claim:—

In combination with an inflatable bladder, a rubber tube projecting from said bladder, a valve body mounted in said tube having a longitudinal hole and a pair of radially extending inlet openings which communicate with the aforesaid hole, an annular cannalure encircling the valve body and communicating with the inlet openings, the end of the tube being adapted to normally cover the inlet openings and the cannalures, said tube end being adapted to be distended when air is blown thru the hole and inlet openings into the bladder, and a screw at the upper end of the valve body being adapted to close the hole against dirt and moisture.

Signed at New York, in the county of New York and State of New York, this 8th day of January A. D. 1923.

CHARLES F. COLLINS.
FRANK J. MAYER.